United States Patent [19]
Yamashita et al.

[11] Patent Number: 4,491,384
[45] Date of Patent: Jan. 1, 1985

[54] OPTICAL SWITCH DEVICE

[75] Inventors: Tsukasa Yamashita, Nara; Masaharu Matano, Kyoto; Kazuhiko Mori, Osaka; Norihiro Ota, Saitama, all of Japan

[73] Assignee: Omron Tateisi Electronics Co., Kyoto, Japan

[21] Appl. No.: 339,309

[22] Filed: Jan. 15, 1982

[30] Foreign Application Priority Data

Jan. 17, 1981 [JP] Japan ................. 56-5442
Feb. 18, 1981 [JP] Japan ................. 56-22663

[51] Int. Cl.³ .................................................. G02B 5/14
[52] U.S. Cl. .................................. 350/96.13; 350/358
[58] Field of Search ............ 350/96.12, 96.13, 96.14, 350/358; 333/101

[56] References Cited

U.S. PATENT DOCUMENTS

| | | | |
|---|---|---|---|
| 3,810,688 | 5/1974 | Ballman et al. | 350/96.14 |
| 4,217,036 | 8/1980 | Chang | 350/358 |
| 4,253,060 | 2/1981 | Chen | 324/77 K |
| 4,297,704 | 10/1981 | Marom et al. | 324/77 K X |
| 4,415,226 | 11/1983 | Verber et al. | 350/96.13 X |

OTHER PUBLICATIONS

"Electro-Optic Multiplexer for Large-Numerical Aperture, Low-Loss Fibers", Gravel et al., Optics Letters, Jul. 1977, vol. 1, No. 1.

"High-Performance Acousto-Optic Guided-Light Beam Device Using Two Tilting Surface Acoustic Waves", Applied Physics Letters, vol. 26, No. 4, pp. 140–142, Feb. 15, 1975, Tasi et al.

*Primary Examiner*—William L. Sikes
*Assistant Examiner*—Akm E. Ullah
*Attorney, Agent, or Firm*—Cushman, Darby & Cushman

[57] ABSTRACT

By an electro-optical switch or an optical switch element utilizing diffraction by a surface acoustic wave, an input light beam is first switched over to one of light beams two or a multiple of two in number and propagating in different directions. By a surface acoustic wave which is discretely variable in frequency, the light beam in each of the different propagation direction is deflected at angles in accordance with the varying frequencies while propagating through an optical waveguide layer. It is possible to obtain by switching a very large total number of output light beams which are equal in number to the number of resolvable deflected light beams obtained in the frequency bandwidth of one surface acoustic wave, multiplied by the number of light beams obtained by switching with the optical switch element.

10 Claims, 7 Drawing Figures

OPTICAL SWITCH DEVICE

BACKGROUND OF THE INVENTION

1. Field of the Invention

The present invention relates to an optical switch device, and more particularly to a multiport optical switch device for switching one or at least two input light beams to one or at least two of a multiplicity of resolvable output light beams at different output locations.

2. Description of the Prior Art

Optical switches are known which utilize an acousto-optic effect. Such switches utilize the Bragg diffraction, i.e. the phenomenon that an incident light propagating through an optical waveguide layer on a piezoelectric substrate, for example, of LiNbO$_3$ is diffracted by a surface acoustic wave (hereinafter referred to as "SAW") propagating on the waveguide layer. The frequency of the SAW, when varied within a suitable range, e.g. in −3 dB bandwidth, alters the deflection angle of the light beam, so that the desired one of resolvable deflected light beams can be selected. To obtain a multiplicity of resolvable deflected light beams, it is required that the frequency of the SAW be varied over a wide range and that each of the individual lights within the aperture of the incident light beam satisfy the Bragg condition with the SAW of one of the frequencies.

Applied Physics Letters, Vol. 26, No. 4, pp. 140-142, Feb. 15, 1975 discloses such a multiport switch under the title "High-performance acousto-optic guided-light-beam device using two tilting surface acoustic waves." The acousto-optic guided-light-beam device includes two SAW interdigital transducers (hereinafter referred to as "IDT's") which are arranged on a waveguide layer and tilted to generate two SAW's propagating in the tilted directions, the transducers being designed to have different center frequencies. The tilting angle between the two SAW IDT's is determined by the difference in the Bragg angles at their center frequency. Reportedly the two transducers have the designed center frequencies of 255 and 382 MHz, respectively, and a tilting angle of approximately 0.3°. The two IDT's are connected in parallel. To be sure, the device provides a multiplicity of resolvable output light beams because the deflection angle of a light beam is variable over a wide range. However, the two IDT's, which must be tilted accurately at a very small angle as described above, are very difficult to fabricate on the optical waveguide layer. The device further involves the problem that since the frequency of the signal to be applied to the two IDT's is varied over a wide bandwidth, it is difficult to match the high-frequency wave generator with the IDT's properly.

SUMMARY OF THE INVENTION

An object of the present invention is to obtain a multiplicity of resolvable output light beams by an optical switch device.

Another object of the invention is to provide an optical switch device which is easy to fabricate and drive.

The optical switch device of this invention comprises an optical waveguide layer made of piezoelectric material, optical switch means for switching the propagation direction of a light beam through the waveguide layer selectively to one of at least two different directions, and means for generating and propagating on the waveguide layer a SAW having such a variable frequency and a propagation direction as to deflect the light beam in each of the different propagation directions at different angles to obtain a plurality of resolvable light beams. Preferably the optical waveguide layer is fabricated on one surface of a piezoelectric substrate, for example, of LiNbO$_3$ crystal. The optical switch means comprises a transducer for generating and propagating on the optical waveguide layer a SAW having such a frequency and a propagation direction as to deflect an incident light beam, or an electro-optical switch having an optical waveguide path for light beam input and two optical waveguide paths for light beam output and variable in refractive index by an electrical field applied to the path. When the piezoelectric substrate is also of electro-optical material, the optical waveguide layer and the electro-optical switch can be fabricated monolithically on the surface of the substrate. Examples of useful SAW generating means are IDT and Gunn diode.

With the optical switch device of the present invention, an incident light beam is first changed over, by the optical switch means, to one of light beams two or a multiple thereof in number and propagating in different directions. By a SAW discretely variable in frequency, the light beam in each of the different propagation directions is deflected at angles in accordance with the varying frequencies to obtain a multiplicity of resolvable light beams by switching. Accordingly it is possible to obtain by switching a very large number of output light beams which are equal in number to the number of resolvable deflected light beams obtained in the frequency bandwidth of one SAW, multiplied by the number of beams obtained by switching by the optical switch means. Since it is unnecessary to vary the frequency of the SAW over a very wide bandwidth, the SAW generating means is easy to drive. Further even when two SAW generating means, e.g. IDT's, are used, the IDT's may be so arranged that the SAW's generated therefrom will propagate in parallel directions. Thus the device is easy to fabricate.

Other features of the invention will become apparent from the following description of embodiments given with reference to the accompanying drawings.

DESCRIPTION OF THE PREFERRED EMBODIMENTS

Figure 1:
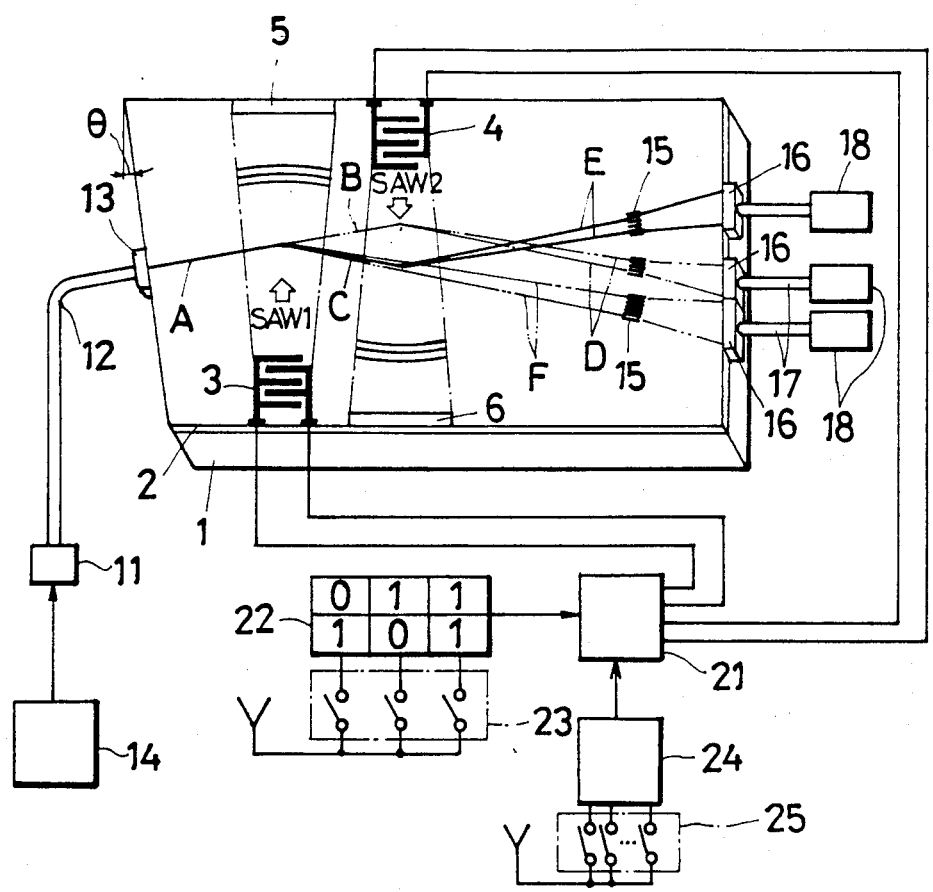
FIG. 1 is a diagram showing a preferred embodiment of the invention including an optical switch device and an electric circuit for controlling the same.

An optical waveguide layer 2 is fabricated on a piezoelectric substrate 1 as of LiNbO$_3$ crystal, for example, by the thermal diffusion of Ti. The layer 2 has a thickness of several μm and a refractive index higher than that of the substrate 1. Examples of other useful materials for the piezoelectric substrate are PLZT, LiTaO$_3$, ZnO, etc. A laser beam emitted from a semiconductor laser 11 is passed through an optical fiber 2 and optical fiber coupler 13 and coupled into the waveguide 2 at one end thereof. A prism coupler, grating coupler or the like is alternatively usable as the optical coupler. The incident beam, when divergent, is collimated by a suitable lens and then led into the waveguide layer 2. When required, the laser beam is modulated by a modulating circuit 14 in an analog or digital form.

Two IDT's 3 and 4 are formed, for example, photolithographically on the waveguide layer 2 at its opposite sides. They are so arranged that the SAW 1 and SAW 2 generated therefrom propagate in opposite directions in parallel. The IDT's are further spaced apart by a suitable distance in the propagation direction of the light beam so that the SAW's 1 and 2 will not interfere with each other. The IDT's 3 and 4 are designed to have the same center frequency fo. Another example of useful SAW generating means is a Gunn diode. SAW absorbers 5 and 6 are disposed at the opposite sides of the layer 2 as opposed to the IDT's 3 and 4, respectively. The IDT's may be provided alternatively on one side of the waveguide layer 2 so that the SAW's 1 and 2 will propagate in the same directions. The propagation direction of the light beam A incident on the waveguide 2 intersects the propagation direction of the SAW 1 at an angle satisfying the Bragg diffraction condition. More specifically the propagation direction of the light beam A is tilted at a Bragg angle $\theta$ at the center frequency fo of the SAW1 with respect to a direction at right angles to the propagation direction of the SAW 1. Because the SAW 1 and SAW 2 propagate in parallel and are identical in center frequency, both the undiffracted light beam B and the light beam C Bragg-diffracted by the SAW 1 satisfy the Bragg diffraction condition with the SAW 2. As seen in FIG. 1, the end of the substrate 1 where the light beam is incident is inclined at the Bragg angle $\theta$ by abrasion, and the IDT's 3 and 4 are arranged on the substrate 1 so that the propagation directions of the SAW's 1 and 2 will be at right angles to the parallel side edges of the substrate 1. Alternatively both the IDT's 3 and 4 are arranged as tilted at the Bragg angle $\theta$ without inclining the end of the substrate 1.

The Bragg diffraction condition is represented by the equation $$\sin \theta = \frac{\lambda}{2T} \quad (1)$$

wherein $\lambda$ is the wavelength of the optical wave, T is the period of the SAW and $\theta$ is the Bragg angle. The light beam interacting with the SAW under the condition of the equation (1) changes in its propagation direction by $2\theta$. This is the deflection of the light beam due to the Bragg diffraction utilizing the SAW.

Figure 2:
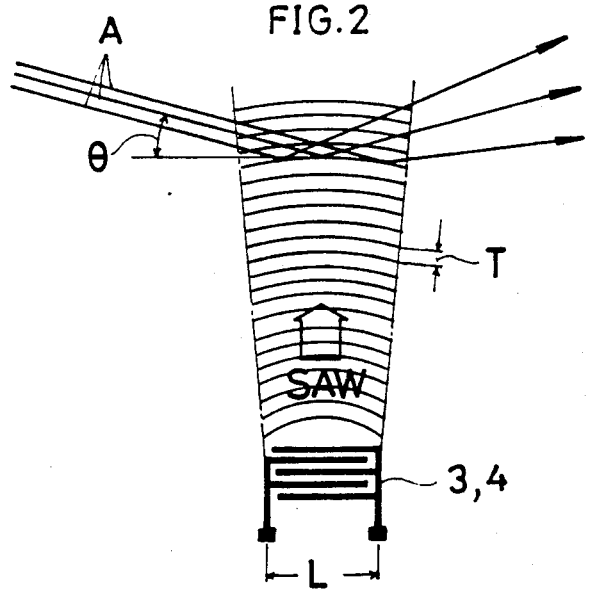
FIG. 2 is a diagram showing an incident light beam as diffracted by a SAW at different angles.

The equation (1) indicates that the angle of deflection $2\theta$ is variable by altering the period T, and therefore the frequency f, of the SAW. Assuming that the angle of incidence $\theta$ of the light beam is constant, the equation (1) is not satisfied when the period T is altered. As shown in FIG. 2, however, the SAW generated from the IDT spreads with circular arc waves in the course of propagation, while the incident light beam A has an aperture, so that the individual lights in the incident light beam A differ in angle $\theta$ with respect to the wave of the SAW. The spreading angle of the SAW increases with the decrease of the width L of the IDT. Consequently, when the frequency f of the SAW is altered, the light included in the incident light beam A and satisfying the equation (1) will be diffracted. The variation $\Delta\theta$ of the angle relative to the variation $\Delta f$ of the frequency is given by the equation $$\Delta\theta \simeq \lambda \cdot \frac{\Delta f}{V} \quad (2)$$

where V is the velocity of propagation of the SAW. With the increase in the variation of the frequency, the variation of the deflection angle also increases but the intensity of the diffracted light beam decreases. Accordingly the bandwidth, centered about the frequency fo, of the frequency that can be varied is naturally determined.

With reference to FIG. 1, when the SAW 2 is propagating in the absence of the SAW 1, the incident light A travels straight, interacts as a light beam B with the SAW 2 and is deflected as indicated at D. The frequency of the SAW 2, when varied, alters the deflection angle of the light beam B. When both SAW 1 and SAW 2 are propagating, the light beam A is deflected by the SAw 1 first as indicated at C, and the light beam C is further defected by the SAW 2 as indicated at E. The frequency of the SAW 2, when varied, alters the deflection angle of the beam C. In this case, the frequency of the SAW 1 may be fixed at the center frequency fo or may be varied simultaneously with the SAW 2. While the SAW 1 is propagating in the absence of the SAW 2, the light beam A is deflected by the SAW 1 as indicated at F. The frequency of the SAW 1, when varied, alters the deflection angle of the light beam A.

With the optical switch device, the deflected light beams D, E and F appear as resolvable light spots. For this purpose, the frequency of the SAW 1 or SAW 2 is discretely varied in accordance with the position of the spot to be formed. The number of resolvable light beam spots, n, obtained by one IDT is given by the equation $$n = \frac{D}{V} \cdot \Delta f \quad (3)$$

where D is the aperture of the light beam, and $\Delta f$ is the frequency bandwidth of the SAW 1 or SAW 2. Since each of the deflected light beams D, E and F involves the number n, the total number N of resolvable light beam spots provided by the device of FIG. 1 is three times n. While two IDT's are used for the device of FIG. 1, the number of IDT's can be increased. When x IDT's are arranged on the optical waveguide layer in the direction of propagation of the light beam, the total number of the spots, N, is given by the equation $$N = (2^x - 1) \cdot n \quad (4).$$

The device referred to in the description of the prior art provides spots in a small total number N which is approximately equal to 2n, with the SAW frequency varied by $2\Delta f$ when two IDT's are used, or in a total number N as small as about 3n, with the SAW frequency varied by $3\Delta f$ when three IDT's are used. The device of FIG. 1 gives N=3n for two IDT's or N=7n for three IDT's, thus affording a larger number of spots by switching. Moreover the SAW frequency needs to be varied only by Δf, so that high-frequency drive signals can be fed to the IDT's through easier matching. The device is also easy to fabricate because two or more IDT's are arranged in parallel.

With reference to FIG. 1, one of the deflected light beam groups D, E and F is selected by a group of switches 23, and the selection signal is sent to a logical circuit 22, which in turn delivers a logical signal indicating the IDT to be excited according to the selection of deflection. A plurality of (n) predetermined frequencies within the bandwidth fo±(Δf/2) are selected by a group of switches 25, and high-frequency signals of the selected frequencies are delivered from a signal generator circuit 24 to a drive circuit 21. In response to the input signals, the circuit 21 excites the IDT specified by the logical signal. The groups of switches 23 and 25 can of course be constructed of transistors or like semiconductor elements.

When desired, the deflected light beam groups D, E and F are further deflected at a larger angle by grating lenses 15 and coupled out from the waveguide layer 2 by optical fiber couplers 16. The optical signals are then led through optical fibers 17 to a suitable external unit or circuits 18, by which the signals are converted to suitable information, e.g. electric signals.

Figure 3:
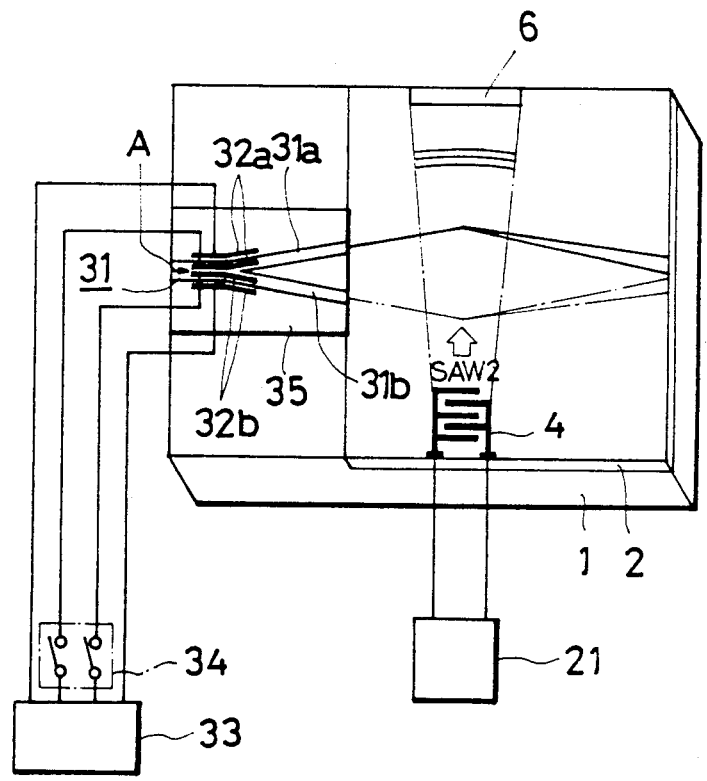
FIG. 3 is a diagram showing another embodiment of the invention including an optical switch device and an electric circuit for controlling the same.

FIG. 3 shows another embodiment including a switchable optical waveguide 31 monolithically formed on one side of a substrate 1 where a light beam is incident and replacing the IDT 3 and SAW 1 of FIG. 1. An optical waveguide layer 2 the same as the one shown in FIG. 1 is formed on the other side of the substrate 1 from which the light beam is emitted. An IDT 4 for generating a SAW 2 when excited by a drive circuit 21 is fabricated on the layer 2 at one horizontal side thereof. An absorber 6 for the SAW 2 is disposed as opposed to the IDT 4.

Figure 4:
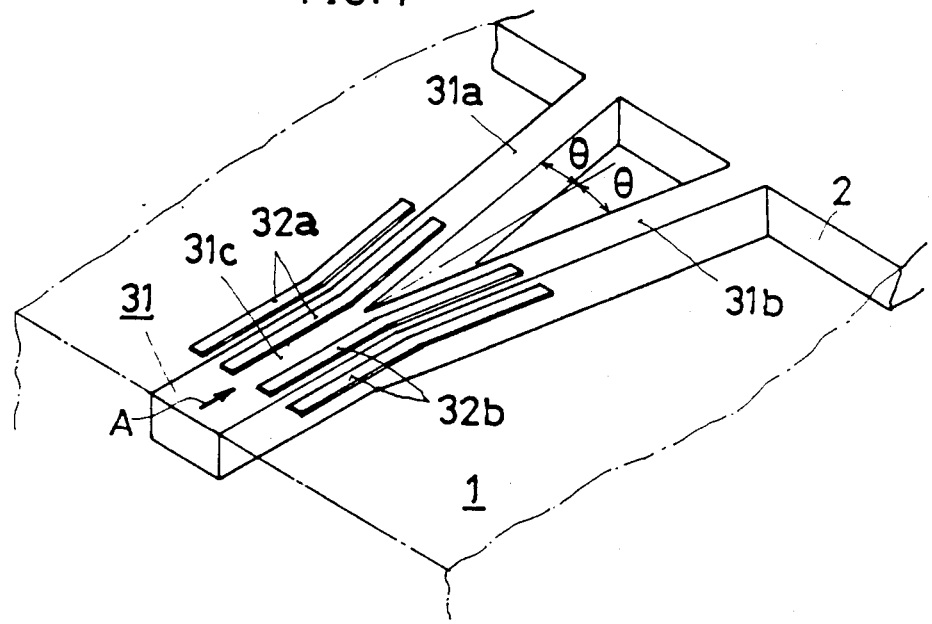
FIG. 4 is an enlarged perspective view showing a switchable optical waveguide.

FIG. 4 shows the optical waveguide 31 on an enlarged scale. Like the waveguide layer 2, the waveguide 31 is fabricated, for example, by diffusing Ti over the substrate 1 of $LiNbO_3$. The waveguide 31 has a higher refractive index than the substrate 1. The waveguide 31 is Y-shaped and comprises an original portion 31c for light beam input and two output branches 31a, 31b tangentially diverting from the portion 31c at equal angles. The angles θ of the branches 31a, 31b with respect to a phantom extension line of the original portion 31c are equal to the Bragg angle of the incident light beam with respect to the SAW 2 at its center frequency fo. The original portion 31c is oriented at right angles with the direction of propagation of the SAW 2. Pairs of electrodes 32a and 32b are provided on the waveguide 31 at its opposite sides and on the substrate 1 alongside the waveguide. These electrodes extend from the original portion 31c to intermediate parts of the branches 31a and 31b. The $LiNbO_3$ substrate 1, which is also of electro-optical material, varies in refractive index when subjected to an electric field. When a suitable voltage is applied across the electrodes 32a by a power supply 33, the portion of the waveguide under the electrodes 32a is given a higher refractive index, with the result that the light beam A propagating through the original portion 31c almost entirely deflects toward the branch 31a and propagates through the branch 31a. Conversely when a voltage is applied across the electrodes 32b, the path of propagation of the light beam is switched to the branch 31b. If no voltage is applied to the electrodes 32a and 32b, the light beam propagates through the two branches 31a and 31b as equally divided. Thus the path of propagation of the light beam can be changed over by a group of switches 34. The optical switches utilizing an electro-optical effect include various types, such as those utilizing phase matching, other than the one shown in FIG. 4. When desired, the optical waveguide 31 may be covered with a scattering preventing film 35 having a refractive index equal or substantially equal to that of the substrate 1.

The laser beam A coupled into the original portion 31c of the waveguide 31 by a suitable optical coupler propagates through the branch 31a or 31b or both the branches 31a, 31b as equally divided. The beams enter the optical waveguide layer 2 and propagate through the layer. When the IDT is excited by the drive circuit 21, the SAW 2 propagates across the paths of propagation of the beams. The beams which are deflected by the waveguide 31 satisfy the Bragg condition with the SAW 2 and are therefore further deflected by 2θ. When the frequency of the SAW 2 is varied, each beam affords a multiplicity of (n) resolvable output light beam spots as in the foregoing embodiment. The present embodiment gives spots in a total number N which is equal to 2n over the frequency bandwidth of fo±(Δf/2). The deflected output light beams are coupled out by a suitable optical coupler. The number of resolvable output light beam spots can be increased with the additional use of two Y-shaped optical waveguides by passing the two light beams from the branches 31a, 31b of the waveguide 31 through the additional waveguides to switchingly obtain four light beams and causing the four beams to interact with the SAW 2. Each of the four beams of course satisfies the Bragg condition with the SAW 2. The total number of the spots obtained in this case is N=4n.

Figure 5:
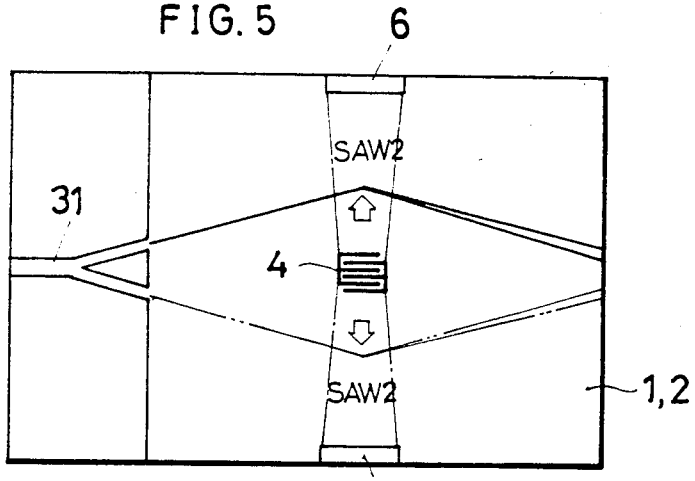
FIG. 5 is a plan view showing a modification of the optical switch device of FIG. 3.

FIG. 5 shows a modification of the device shown in FIG. 3. An IDT 4 is disposed on an optical waveguide layer 2 at the widthwise midpoint thereof. The IDT produces two SAW's 2 propagating in opposite directions. Two light beams deflected by a waveguide 31 interact with these SAW's 2. The two light beams are diffracted by the SAW's 2 at positions at equal distances from the IDT 4 and can therefore be diffracted under exactly the same conditions, hence advantageous.

Figure 6:
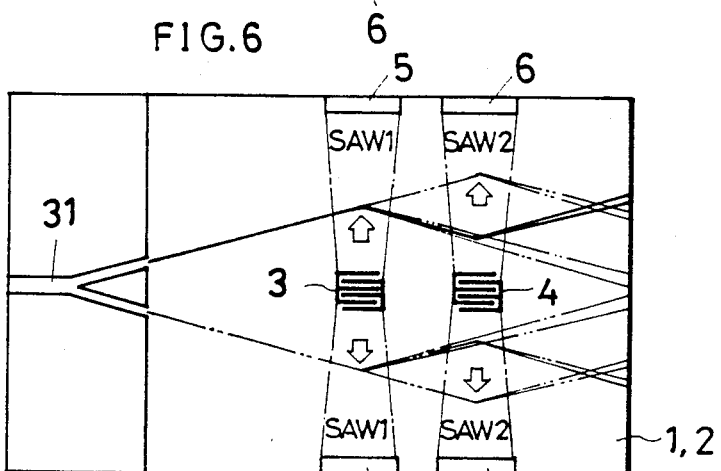
FIGS. 6 and 7 are plan views each showing a more sophisticated optical switch device comprising the devices of FIGS. 1 and 3 in combination.

FIG. 6 shows a combination of the device of FIG. 1 and the device of FIG. 3. Fabricated on a substrate 1 or waveguide layer 2 are a Y-shaped optical waveguide 31 and two IDT's 3, 4 which are arranged along the direction of propagation of a light beam. The two IDT's 3, 4 are disposed at the widthwise midportion of the substrate 1 or layer 2 and spaced apart by such a distance that the SAW's 1 and SAW's 2 generated therefrom will not interfere with each other. Each of the light beams switchably provided by the waveguide 31 in two directions is further switched between two directions by the SAW 1 of the IDT 3. Each of the four divided beams is deflected at n angles by varying the frequency of the SAW 2. In the absence of the SAW 2, each of the light beams from the waveguide 31 is deflected at n angles at varying frequencies of the SAW 1.

Figure 7:
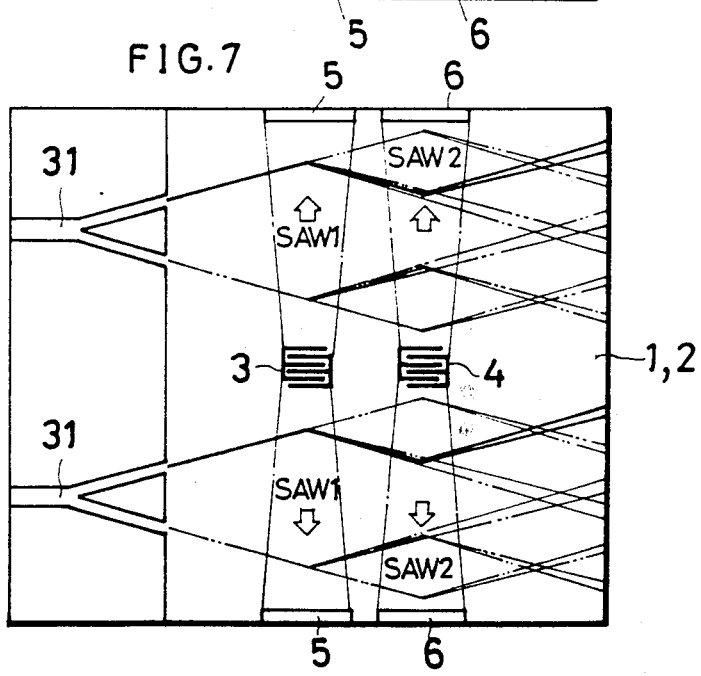

The device of FIG. 6 is further developed into the device shown in FIG. 7. Two incident ligh beams can be subjected to switching by this device. Two optical waveguides 31 for the two incident light beams are fabricated on a substrate 1 and spaced apart by a suitable distance in a direction at right angles to the propagation direction of the beams. Two IDT's 3 and 4 are arranged on an optical waveguide layer 2 along the propagation direction in front of the waveguides 31 with respect to this direction intermediately of the waveguides 31. SAW's 1 and SAW's 2 propagate from these IDT's 3 and 4, respectively, in opposite directions for deflecting the light beams from the waveguides 31 for switching.

The combination of Y-shaped waveguides and IDT's provides resolvable spots in a very large total number N. In principle, a device having m Y-shaped optical waveguides and x IDT's switchably affords spots in a total number N which is given by the following equation.

$$N = 2m \cdot (2^x - 1) \cdot n \qquad (5).$$

What is claimed is:

1. An optical switch device comprising:
   an optical waveguide layer made of piezoelectric material,
   optical switch means for switching the propagation direction of an information carrying light beam through the waveguide layer to one of at least two different directions, and
   means for generating and propagating on the waveguide layer a surface acoustic wave having a variable frequency and a propagation direction adapted for deflecting the light beam in each of the different propagation directions at different angles to obtain a plurality of resolvable light beams.

2. An optical switch device as defined in claim 1 wherein a plurality of optical switch means are provided, and the light beam switched to one of the two propagation directions by one of the optical switch means is further switched to one of two propagation directions by another optical switch means.

3. An optical switch device as defined in claim 1 which further comprises an electric control unit for feeding a switching signal to the optical switch means.

4. An optical switch device as defined in claim 1 which further comprises a unit for generating a high-frequency signal for exciting the means for generating the surface acoustic wave, and the frequency of the ouput signal of the unit is variable.

5. An optical switch device as defined in claim 1 which further comprises an input optical coupler.

6. An optical switch device as defined in claim 1 which further comprises an output optical coupler for coupling the resolvable light beams deflected at the different angles out of the waveguide layer at different positions.

7. An optical switch device as defined in claim 1 wherein the optical switch means is a transducer for generating and propagating on the waveguide layer a surface acoustic wave having a frequency and a propagation direction adapted to deflect an incident light beam.

8. An optical switch device as defined in claim 1 wherein the optical switch means is an electro-optical switch having an optical waveguide path for light beam input and two optical waveguide paths for light beam outputs and includes electrodes for applying an electric field to vary the refractive index of the optical waveguide path.

9. An optical switch device as defined in claim 1 wherein the optical waveguide layer is fabricated on one surface of a piezoelectric substrate.

10. An optical switch device as defined in claim 8 wherein the optical waveguide layer and the electro-optical switch are fabricated monolithically on one surface of a piezoelectric substrate made of electro-optical material.

* * * * *